United States Patent [19]

Chahl et al.

[11] Patent Number: 5,790,181

[45] Date of Patent: Aug. 4, 1998

[54] PANORAMIC SURVEILLANCE SYSTEM

[75] Inventors: Javaan Singh Chahl, Curtin; Martin Gerard Nagle, Richardson; Mandyam Veerambudi Srinivasan, Florey; Peter John Sobey, Giralang, all of Australia

[73] Assignee: Australian National University, Acton, Australia

[21] Appl. No.: 601,053

[22] PCT Filed: Aug. 25, 1994

[86] PCT No.: PCT/AU94/00501

§ 371 Date: May 1, 1996

§ 102(e) Date: May 1, 1996

[87] PCT Pub. No.: WO95/06303

PCT Pub. Date: Mar. 2, 1995

[30] Foreign Application Priority Data

Aug. 25, 1993 [AU] Australia .................... PM0812

[51] Int. Cl.$^6$ ........................................ H04N 7/00
[52] U.S. Cl. ............................... 348/36; 348/143
[58] Field of Search ............... 348/36, 143; H04N 7/00

[56] References Cited

FOREIGN PATENT DOCUMENTS

| 41 163/72 | 10/1973 | Australia | G08B 13/18 |
|---|---|---|---|
| B-39249/89 | 2/1990 | Australia | G08B 13/18 |
| 0 113 069 | 7/1984 | European Pat. Off. | G08B 13/18 |
| 0 542 170 | 5/1996 | European Pat. Off. | |
| 59-24228 A | 2/1984 | Japan | G08B 13/18 |
| 2 080 945 | 2/1982 | United Kingdom | G01B 13/18 |

*Primary Examiner*—Howard W. Britton
*Assistant Examiner*—Vu Le
*Attorney, Agent, or Firm*—Seed and Berry LLP

[57] ABSTRACT

A panoramic imaging system, for monitoring a space, comprises a single camera and a dome-like convex mirror. The camera is mounted relative to the mirror so that at least most of the surface of the mirror is within the field of view of the camera. The mirror has an elevation gain, $\alpha$, greater than 3 and a profile which (a) ensures that radiation from at least most of the space is reflected by the mirror onto the image plane of the camera, and (b) satisfied the relationship, in polar co-ordinates, $$\mathrm{Sin}[A+0.5(1+\alpha)\theta]=C.r[-0.5(1+\alpha)]$$

where C is a constant and A specifies the inclination of the profile to the optical axis of the camera at the point on the mirror which is closest to the aperture lens of the camera. The camera may be an electronic camera having a charge coupled device (CCD) sensor at its image plane, and the processed image of the space produced by the camera may be displayed on a monitor screen as a dewarped image. A motion sensing algorithm may be included in the image processing system of the electronic camera to generate an alarm when motion is sensed in the space.

13 Claims, 3 Drawing Sheets ns
5,790,181

1

PANORAMIC SURVEILLANCE SYSTEM

TECHNICAL FIELD

This invention concerns surveillance systems. More particularly, it concerns imaging systems for the panoramic surveillance of a space using a single, stationary, camera.

BACKGROUND OF THE INVENTION

With recent increases in the occurrence of the crimes of theft and armed robbery, it has become commonplace to install a system for the surveillance of supermarkets, shop checkout areas, banks and other spaces. Conventional surveillance systems use either multiple video cameras (each monitoring a zone of the space) or a single, mechanically scanned camera. The former of these systems requires the observer to check several image displays to monitor the entire field of view. The latter type of system displays only a narrow field of view at any instant, which reduces the value of the system as a surveillance tool.

Both of these conventional surveillance systems are quite expensive, requiring either multiple cameras and monitors or a mechanical drive for scanning the camera. Systems employing moving cameras consume more power and require more maintenance. A further disadvantage of the moving camera system is that any motion of an object that is within the image is difficult to detect from simple observation of a monitor screen, due to the apparent continual full-field image motion that is induced by the movement of the camera.

SUMMARY OF THE PRESENT INVENTION

It is an object of the present invention to produce a surveillance system which utilises a single camera, which requires no movement of that camera, and yet which has a panoramic field of view that can be displayed on a single monitor screen.

This objective is achieved using a suitable camera (an electronic camera—either a "still" camera or a video camera—having a charge coupled device (CCD) sensor at its image plane, being particularly suitable) and a dome-like convex mirror. Typically the dome-like convex mirror is mounted on the ceiling of a room to be monitored (though the mirror may be mounted in other locations whenever it is more appropriate to do so in view of the nature of the surveillance to be performed). The camera is mounted relative to the mirror in such a manner that a major part (if not all) of the curved surface of the mirror is within the field of view of the camera. The mirror has a profile such that it projects most—preferably all—of the environment in which the mirror is mounted onto the imaging plane of the camera.

Thus, according to the present invention there is provided a panoramic imaging system for a space, said system comprising (i) a camera and (ii) a mirror, said system being characterised in that:

(a) the mirror is a dome-like convex mirror, having a generally smoothly curved surface;
(b) the camera is mounted relative to the mirror so that at least a major portion of the surface of the mirror is within the field of view of the camera;
(c) the mirror has a profile such that the mirror projects radiation from at least a major part of said space onto the imaging plane of the camera; and
(d) said mirror has an elevation gain, α, which is greater than 3, and the profile of said dome-like mirror satisfies the relationship, in polar co-ordinates,

2

$$Sin[A+0.5(1+\alpha)\theta]=C.r[-0.5(1+\alpha)]$$

where the origin of the co-ordinates is at the actual or virtual position of the aperture lens of said camera, r is the distance of a point on the mirror profile from the origin along a direction inclined at an angle θ with respect to the optical axis of the camera, C is a constant, and A specifies the inclination of the profile to the optical axis of the camera at the point on said dome-like mirror which is closest to the aperture lens of the camera.

Preferably an electronic camera having a charge coupled device (CCD) sensor at its imaging plane is used in implementations of the present invention. Such a camera (which may be a video camera or a "still" camera which produces an image in a fairly long time, of up to one minute) will produce a warped image of the space being observed, which may be displayed directly on a monitor screen. Alternatively, the signal processing of the output of the camera sensor may be modified so that the image co-ordinates are changed and a de-warped image is displayed on the monitor screen. If movement detecting software is included as part of the signal processing package, any movement within the region being monitored will be detected and the attention of an observer drawn to it (for example, by displaying the image of the zone where movement is occurring in a colour which contrasts with the colour of the remainder of the image, and preferably also by generation of an audio tone).

The significance of these and other, optional features of the present invention will become more apparent from the following description of embodiments of the invention, which is provided by way of example only. In the following description, reference will be made to the accompanying drawings.

BRIEF DESCRIPTION OF THE ACCOMPANYING DRAWINGS

Figure 1:
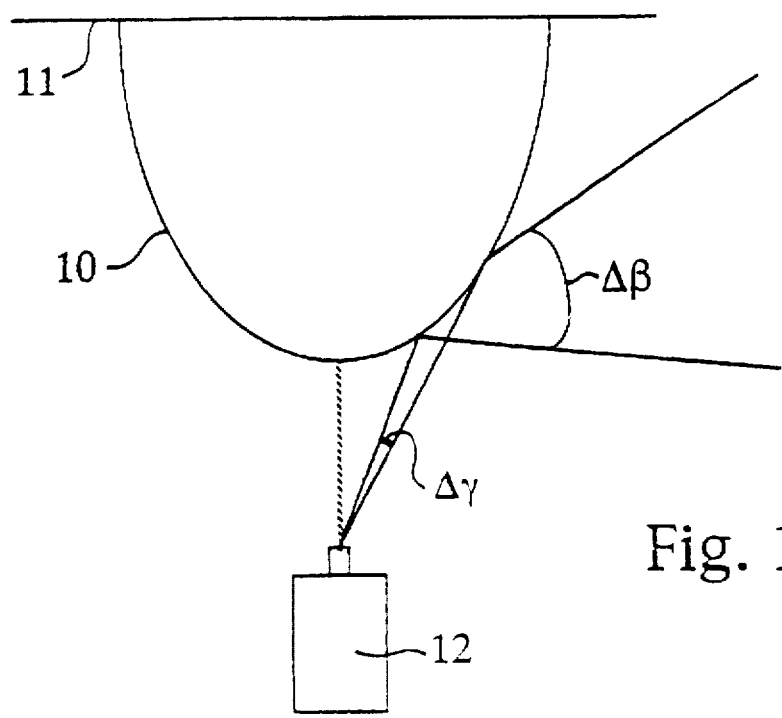
FIG. 1 shows one mirror and camera configuration that may be used in implementations of the present invention.
Figure 3:
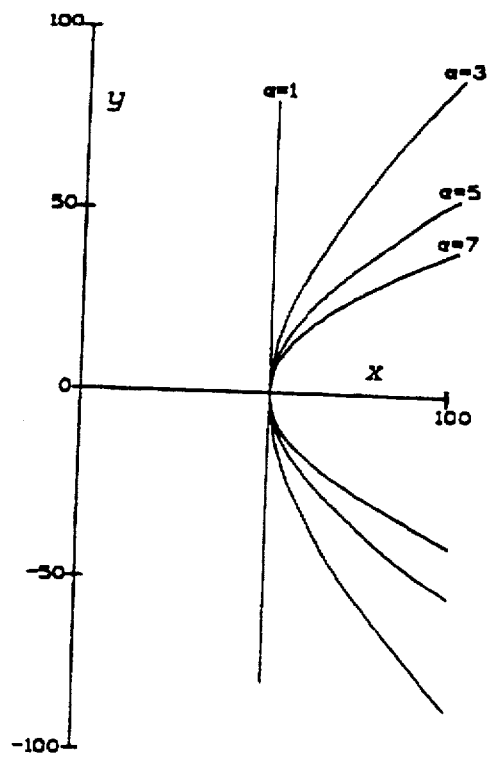

FIG. 3 contains the profiles of mirrors having elevation gains (defined below) of 1, 3, 5 and 7, when the mirror and camera configuration shown in FIG. 1 is adopted.

Figure 4:
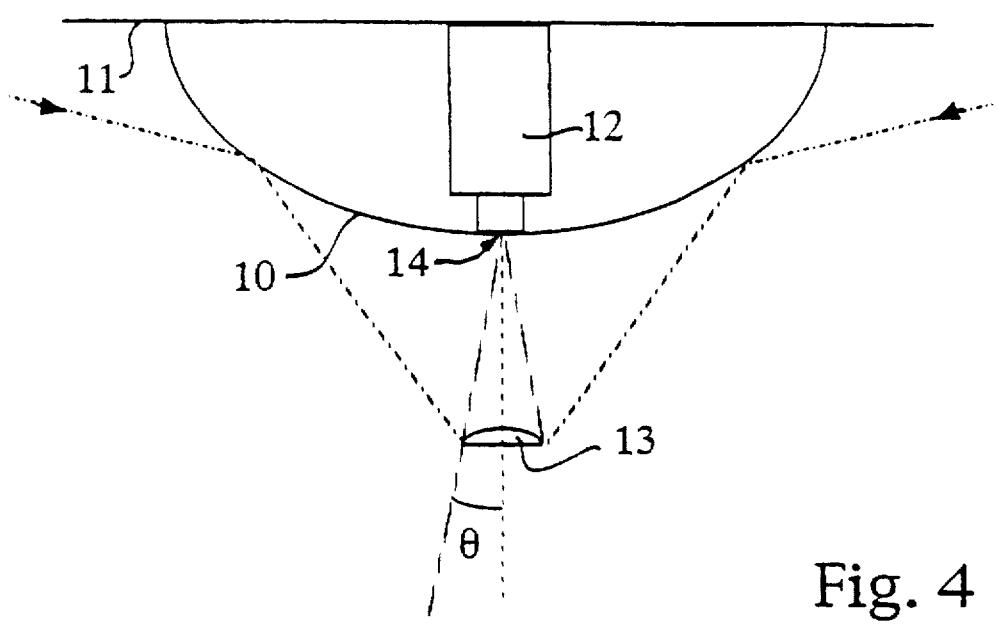

FIG. 4 shows a compact form of the mirror and camera configuration, which utilises a supplementary mirror to establish the required panoramic surveillance.

Figure 5:
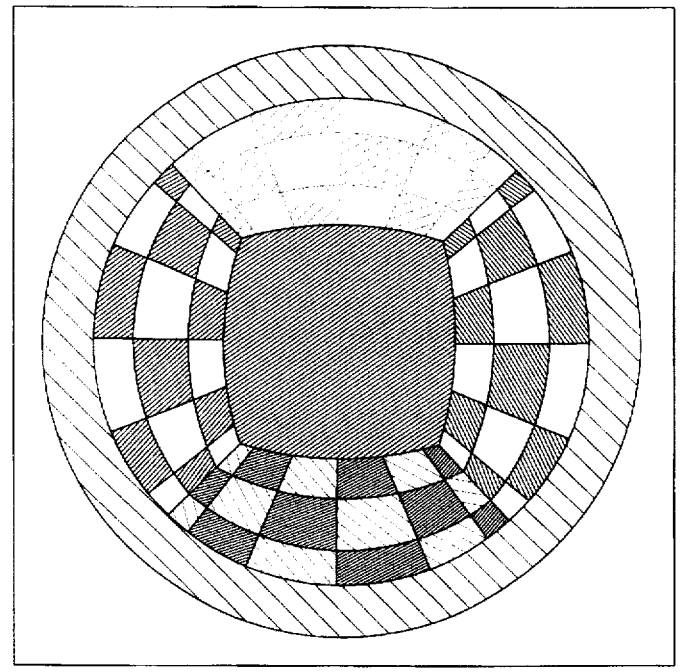

FIG. 5 is a drawing of the monitor screen image of a square room, 2.5 meters high and with each wall 5 meters long, obtained using the mirror and camera configuration that is shown in FIG. 1.

Figure 6:
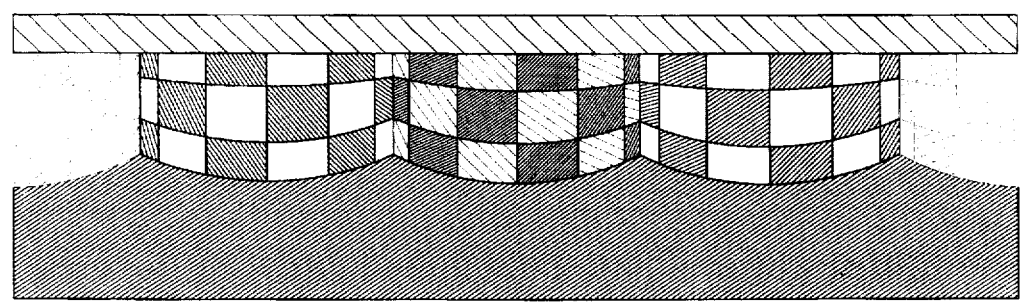

FIG. 6 is a drawing of the monitor screen image that is obtained when the image of FIG. 5 is de-warped.

DETAILED DESCRIPTION OF THE ILLUSTRATED EMBODIMENTS

In the arrangement shown in FIG. 1, a dome-like convex mirror 10, which has a circularly-symmetrical surface, is attached to the ceiling 11 of a room that is the subject of surveillance. This is expected to be the most usual way in which the imaging system will be used but, as noted above, this invention may be used in a variety of monitoring situations, including situations where it would be inappropriate—or impossible—to mount a dome-like convex mirror on a ceiling, a high beam or a high platform. The profile of the mirror 10 may be any one of a large number of practical profiles, several of which are described in more detail below. The mirror profile will be selected according to the magnification requirements of the surveillance system.

A camera 12 is mounted directly below the mirror 10, facing upwards. That is, the camera is mounted with the axis of its field of view collinear with the axis of symmetry of the mirror profile. With this arrangement, the mirror 10 will project radiation from a large portion of the room underneath the ceiling 11 onto a circular region of the sensor at the image plane of the camera 12. Thus the image produced by the camera (a typical image being shown in FIG. 5 of the accompanying drawings) represents 360° of the monitored environment in azimuth and from −90° (that is, vertically downwards in the arrangement shown in FIG. 1) to positive values (that is, to above the horizontal) in elevation. In practice, the lowest elevation is determined by the size of the camera and its mount, which blocks the view directly downwards from the central point of the mirror 10, and the highest elevation is determined by the axial length of the mirror and the shape of its profile.

In the circular image that is generated by the mirror 10, a given radial direction corresponds to a specific azimuth in the environment, and increasing radii correspond to increasing elevations. The profile of the mirror is preferably chosen to map equal changes of elevation on to equal changes of radius in the image. The elevation gain $\alpha$ is defined as the increase of the angle of elevation ($\Delta\beta$) per unit increase in the angle of divergence from the optical axis of the corresponding ray ($\Delta\gamma$) entering the camera through the nodal point, as illustrated in FIG. 1.

The profile of the circularly symmetrical mirror 10 can be defined in polar or Cartesian co-ordinates, according to any selected co-ordinate system. In this specification, the polar co-ordinates (r,$\theta$) and the corresponding Cartesian co-ordinates (x,y) for the mirror are those shown in FIG. 2, where the point (0,0) in each system corresponds to the point where the aperture lens of the video camera 12 is positioned.

Figure 2:
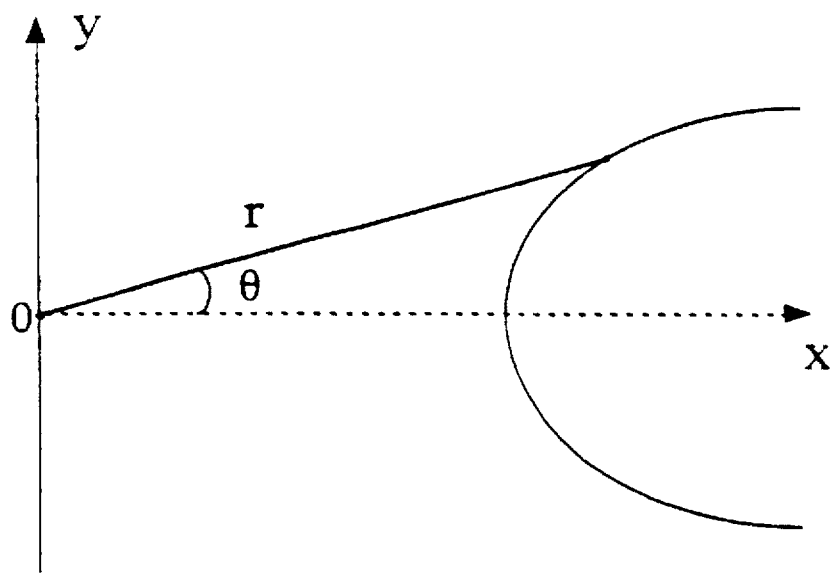
FIG. 2 illustrates the polar and cartesian co-ordinate systems used in this specification when defining the profile of a mirror.

The profile of the mirror 10 can be adjusted to obtain any desired value of elevation gain that is greater than unity. It can be shown that for any elevation gain $\alpha$, which is not necessarily an integer, the requisite profile in polar co-ordinates must satisfy the equation:

$$\mathrm{Sin}[A+0.5(1+\alpha)\theta]=C.r.[-0.5(1+\alpha)]$$

where the origin is at the nodal point (the aperture lens of the camera), r is the distance to the mirror profile from the origin along a direction inclined at an angle $\theta$ with respect to the optical axis of the camera (see FIG. 2); C is a constant whose value depends upon the nearest distance of the profile to the nodal point, and A specifies the inclination of the profile to the optical axis of the camera at the point on the profile which is nearest.

Examples of mirror profiles for a few selected values of elevation gains are given below. In each of these Examples it has been assumed that A=90° (that is, that the surface of the mirror is normal to the optical axis of the camera where the axis of the camera intersects the mirror 10).

EXAMPLE 1

Elevation Gain=1

Although a mirror having an elevation gain of unity is not be used in the present invention, this example is included for the sake of completeness of this description. The polar equation specifying the profile of the mirror is $$r = \frac{r_o}{\cos\theta}$$

where $r_o$ is the shortest distance between the profile and the nodal point. In Cartesian co-ordinates, the corresponding equation (with reference to the same origin) is $$x=r_o, \forall y$$

where x denotes axial distance and y denotes radial distance, as illustrated in FIG. 3. These equations define a plane mirror with its plane normal to the optical axis of the camera, at a distance $r_o$ from the camera's nodal point. (Values of A other than 90° yield cones of semi-vertical angle A.)

EXAMPLE 2

Elevation Gain=3

The polar equation specifying the profile of a mirror having an elevation gain of 3 (the highest previously contemplated gain) is $$r^2 = \frac{r_o^2}{\cos 2\theta}$$

where $r_o$ is the distance between the tip of the profile and the nodal point. In Cartesian co-ordinates, the corresponding equation (with reference to the same origin) is $$x^2-y^2=r_o^2$$

where x denotes axial distance and y denotes radial distance, as illustrated in FIG. 3. This mirror profile is a rectangular hyperbola, whose profile asymptotically approaches that of a 90° cone as x and y approach infinity.

EXAMPLE 3

Elevation Gain=5

The polar equation specifying the profile of a mirror having an elevation gain of 5 is $$r^3 = \frac{r_o^3}{\cos 3\theta}$$

where $r_o$ is the distance between the tip of the profile and the nodal point. In Cartesian co-ordinates, the corresponding equation (with reference to the same origin) is $$x(x^2-3y^2)=r_o^3$$

where x denotes axial distance and y denotes radial distance, as illustrated in FIG. 3.

EXAMPLE 4

Elevation Gain=7

The polar equation specifying the profile of a mirror having an elevation gain of 7 is $$r^4 = \frac{r_o^4}{\cos 4\theta}$$

where $r_o$ is the distance between the tip of the mirror profile and the nodal point. In Cartesian co-ordinates, the corresponding equation (with reference to the same origin) is $$(x^2+y^2)^2 - 8x^2y^2 = r_o^4$$

where x denotes axial distance and y denotes radial distance as illustrated in FIG. 3.

It should be noted that in each of the examples given above, it has been assumed that A=90°. If A should have a value other than 90°, a sharp point would be present at the tip of the mirror, rather than a flat surface. Such profiles (which are intended to be included within the scope of the term "dome-like" whenever this term is used in this specification) would be useful in excluding the image of the camera in the mirror, and would allow the best use to be made of the camera's imaging surface in capturing the environment.

It is also within the scope of this invention to use a dome-like mirror which has a composite mirror profile, which produces different gains at different elevations and thus serves to magnify certain elevation bands at the expense of other elevations.

As mentioned above, the circular image produced on a monitor screen by conventional processing of the output signals of a still camera (or a video camera) having a charge coupled device (CCD) sensor at its image plane, when the arrangement shown in FIG. 1 is used, is usually a warped version of the monitored environment, in which the azimuth corresponds to the environmental azimuth and the radial distance corresponds to the elevation angle. An example of this warped image is shown in FIG. 5, which is the image obtained with a video camera, using the arrangement of FIG. 1, of a square room in which each wall has a length of 5 meters, and the floor-to-ceiling height is 2.5 meters.

To assist the interpretation of this image, it may be de-warped using modified image signal processing (with a suitably programmed computer or microprocessor) to convert it into a system of Cartesian co-ordinates, $\hat{x},\hat{y}$, where the transformation between the warped image, defined on the Cartesian co-ordinates (x,y), and the de-warped image, defined on the Cartesian co-ordinates $(\hat{x},\hat{y})$ is defined by $$x = k \cdot \hat{y} \cdot \cos(\hat{x})$$

$$y = k \cdot \hat{y} \cdot \sin(\hat{x}).$$

Thus, the intensities at each pixel location $(\hat{x},\hat{y})$ in the de-warped image can be obtained by reading off the corresponding intensities at locations (x,y) in the warped image, as specified by the above transformation. Since each $(\hat{x},\hat{y})$ pixel location in the de-warped image may not necessarily correspond to the centre of an (x,y) pixel location in the warped image, an interpolation procedure is necessary to compute the intensity at the appropriate location in the warped image. The conversion algorithm, therefore, implements the transformation as well as the interpolation.

The image processing algorithm for effecting the de-warping of the image may be any one of a number of known algorithms for effecting the required transformation, but skilled programmers will be able to generate their own algorithm or algorithms for this purpose.

A de-warped version of the image of FIG. 5 is shown in FIG. 6.

In some situations, it is impractical or undesirable to mount a camera beneath a dome-like mirror, as shown in FIG. 1. In such a situation, the compact arrangement shown in FIG. 4 may be adopted.

In the arrangement shown in FIG. 4, the camera 12 is mounted within the shell of a hollow dome-like mirror 10 that is attached to the ceiling 11 (or other suitable structure) which forms one of the boundaries of the space to be monitored. A small opening at the lowermost point 14 of the mirror 10 permits the CCD sensor of the camera to receive radiation from a solid angle θ. A small, supplementary mirror 13 is mounted directly below the opening 14, with the reflecting surface of the mirror 13 uppermost. Radiation from the environment being monitored is directed by the dome-like mirror 10 onto the supplementary mirror 13, which reflects it through the opening 14 and onto the CCS sensor of the camera 12.

Not only does the arrangement illustrated in FIG. 4 reduce the physical size of the surveillance equipment, but the blind spot below the central (lowermost) point or tip of the mirror 10 is also reduced. The elevation gain of the two-mirrors combination shown in FIG. 4 is distributed between the mirrors 10 and 13.

When an electronic camera having a CCD sensor is used in an implementation of the present invention, the digital image processing of the output signals of the video camera enables automatic motion sensing to be used with the surveillance system. With such an arrangement, motion within any part of the monitored space is sensed automatically, and an appropriate alarm is generated. As noted above, this alarm may comprise colour-coding of the region in the image which corresponds to the azimuth and elevation where motion has been sensed, and/or the generation of an audio alarm signal. This is a valuable optional feature because human observers tend to suffer from lapses of concentration when required to attend to visual tasks for extended periods. As a result, the very event that the surveillance system is designed to detect could be overlooked. The generation of a suitable alarm signal means that the surveillance system can be used effectively without the constant supervision of an operator.

The resolution of the image seen by an operator of the surveillance equipment is dictated by the quality of the imaging used in the camera of the installation. Due to the design of the reflective surfaces, resolution on the vertical axis on the user's display (elevation) is constant across the image, (that is, half of the number of lines on the CCD—the radius of the surface projected onto the cameras—represents the full range of elevation).

The de-warping process—if used—causes resolution in azimuth to be directly dependent on elevation. This is not apparent to the operator because low elevation pixels in the de-warped image are stretched to ensure that the user display is rectangular. This property may at first appear to be a major drawback of the system. However, it will be apparent that nearby objects are also those at low angles of elevation (they will be under the camera). Thus, despite the fact that near objects will be sampled by fewer pixels per degree, the near objects also subtend a greater number of degrees. In this situation, objects at longer distances will be represented in the de-warped image by a similar number of pixels to those which represent objects which are close to the camera.

Industrial Applicability

The imaging system of the present invention has applications in a wide number of security related areas, including banks, museums, art galleries, hotels and casinos, interview rooms in police stations, government departments, shops and shopping centres, customs, security apartments and carparks. The surveillance system is also very well suited to tasks which require the detection and signalling of movement in designated areas of a room, but not in other areas, such as the region around an objet d'art in an art gallery. It can also be used on gantries as a collision warning device. Another potential application is in the area of time, space and motion studies of a factory floor or a supermarket. Thus, the system of the present invention is not restricted to surveillance tasks, but is applicable more generally to tasks which require panoramic monitoring of a large area. The present invention can also be extended to measure the ranges of objects within the panoramic field of view. In this way it can be used as a surveying instrument to map the topography of the surrounding environment.

By way of summary, a brief (and not exhaustive) list of potential applications of the present invention is as follows: security surveillance systems (as noted above);

traffic monitoring and control, especially at major road intersections;

airport surveillance: panoramic monitoring of an airfield from a control tower;

in aircraft underbellies, to enable pilots to view "blind" regions beneath the passenger compartment of an aircraft;

in ships and aircraft carriers, mounted on a mast to provide a panoramic view of decks;

as a panoramic periscope in submarines and elsewhere;

as a "seeing eye" that can be mounted on a cargo container to warn of potential obstacles when the container is being moved by a crane;

remote monitoring of industrial processes;

monitoring of activity on workshop floors in conjunction with time and motion studies; and coastline surveillance.

It will be apparent from this list that although specific embodiments of the present invention are illustrated and described in this specification, modifications of those embodiments may be made without departing from the present inventive concept.

We claim:

1. A panoramic imaging system for a space, said system comprising:

a dome-like convex mirror, having a generally smoothly curved surface; and a camera mounted relative to said mirror so that at least a major portion of the surface of the mirror is within the field of view of the camera, the camera having an aperture lens;

said mirror having an elevation gain, α, which is greater than 3 and a profile such that said mirror reflects radiation from at least a major part of said space onto the image plane of the camera, said profile satisfying the relationship, in polar co-ordinates, $$\mathrm{Sin}[A+0.5(1+\alpha)\theta]=C^*r^*[-0.5(1+\alpha)]$$

where the origin of the co-ordinates is at the actual or virtual position of the aperture lens of said camera, r is the distance of a point on the mirror profile from the origin along a direction inclined at an angle θ with respect to the optical axis of the camera, C is a constant, and A specifies the inclination of the profile to the optical axis of the camera at the point on said dome-like mirror which is closest to the aperture lens of the camera.

2. A panoramic imaging system as defined in claim 1, in which axis of symmetry of said dome-like mirror is aligned with the optical axis of said camera.

3. A panoramic imaging system as defined in claim 2, in which said space is a volume, said dome-like mirror is mounted at or near the top of said volume, and said camera is mounted directly below said mirror.

4. A panoramic imaging system as defined in claim 3, in which said volume is a room with a ceiling and said dome-like mirror is mounted on said ceiling.

5. A panoramic imaging system as defined in claim 3, in which:

said dome-like mirror is formed as a hollow shell with an opening therein at the axis of symmetry of said dome-like mirror, said camera is mounted within said shell; and a supplementary mirror is mounted outside said shell on the axis of symmetry of said dome-like mirror, with the reflective surface of said supplementary mirror facing said dome-like mirror;

the mirrors and camera being configured such that (i) radiation incident upon said dome-like mirror from at least a major part of said space is reflected by said dome-like mirror onto the reflective surface of said supplementary mirror which, in turn, reflects said radiation through said opening and onto the image plane of said camera; and (ii) the aperture lens of said camera has a virtual position outside said shell, said virtual position being a distance from said opening which is a function of (1) the distance between the reflective surface of said supplementary mirror and said aperture lens, (2) the reflective characteristics of said dome-like mirror and said supplementary mirror, and (3) the distance between said opening and the reflective surface of said supplementary mirror.

6. A panoramic imaging system as defined in claim 5, in which said space is a volume and said dome-like mirror is mounted at or near the top of said volume with said opening at the lowermost point of said dome-like mirror.

7. A panoramic imaging system as defined in claim 1, in which said camera is an electronic camera having a charge coupled device (CCD) sensor at its image plane, and the output of said sensor is connected to signal processing means which produces an image of said space on a monitor screen.

8. A panoramic imaging system as defined in claim 7, in which said image on the monitor screen is a warped image of said space.

9. A panoramic imaging system as defined in claim 7, in which said signal processing means is programmed to produce a de-warped image of said space on said monitor screen.

10. A panoramic imaging system as defined in claim 7, in which said signal processing means includes a motion sensing algorithm which is adapted to sense motion within said space and to provide an indication of the occurrence of said motion.

11. A panoramic imaging system as defined in claim 10, in which said indication comprises the display of the region in said space within which motion has been sensed on said monitor screen in a colour which is different from the normal colour or colours used for said image on said monitor screen.

12. A panoramic imaging system as defined in claim 10, in which said indication comprises the generation of an audio tone.

13. A panoramic imaging system as defined in claim 7, in which said camera is a video camera.

* * * * *